(12) United States Patent
Kruspe et al.

(10) Patent No.: US 10,731,440 B2
(45) Date of Patent: Aug. 4, 2020

(54) DOWNHOLE FUEL CELL WITH STEAM ADSORPTION AND PRESSURE COMPENSATION AND METHODS OF USING SAME

(71) Applicant: BAKER HUGHES INCORPORATED, Houston, TX (US)

(72) Inventors: Thomas Kruspe, Wietzendorf (DE); Joachim F. Oppelt, Niedersachsen (DE)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

(21) Appl. No.: 15/457,441

(22) Filed: Mar. 13, 2017

(65) Prior Publication Data

US 2018/0258739 A1 Sep. 13, 2018
US 2019/0178058 A9 Jun. 13, 2019

Related U.S. Application Data

(63) Continuation of application No. 13/920,623, filed on Jun. 18, 2013, now Pat. No. 9,593,562.

(51) Int. Cl.
*E21B 41/00* (2006.01)
(52) U.S. Cl.
CPC ..... *E21B 41/0085* (2013.01); *H01M 2250/00* (2013.01)
(58) Field of Classification Search
CPC .......................... E21B 43/2401; E21B 41/0085
See application file for complete search history.

(56) References Cited

U.S. PATENT DOCUMENTS

| 4,479,364 | A | 10/1984 | Maier-Laxhuber |
| 5,202,194 | A | 4/1993 | VanBerg, Jr. |
| 6,835,219 | B2 | 12/2004 | Gittleman |
| 7,147,965 | B2 * | 12/2006 | Hall ............... H01M 2/025 429/176 |
| 9,593,562 | B2 * | 3/2017 | Kruspe .............. E21B 43/2401 |
| 2002/0011335 | A1 | 1/2002 | Zhang |
| 2002/0034668 | A1 | 3/2002 | Zhang et al. |
| 2005/0211436 | A1 | 9/2005 | Fripp et al. |
| 2005/0224258 | A1 | 10/2005 | Fincher |
| 2006/0257697 | A1 * | 11/2006 | Zhang ................ E21B 41/0085 429/418 |
| 2007/0215342 | A1 | 9/2007 | Fincher et al. |
| 2010/0055508 | A1 | 3/2010 | Renn |
| 2011/0290483 | A1 | 12/2011 | Zornes |
| 2014/0367120 | A1 * | 12/2014 | Kruspe .............. E21B 43/2401 166/381 |

FOREIGN PATENT DOCUMENTS

| JP | 2003109643 A | 4/2003 |
| KR | 20070072989 A | 7/2007 |
| WO | 3033862 A1 | 4/2003 |
| WO | 2012166040 A1 | 12/2012 |

OTHER PUBLICATIONS

EPO ApplicationNo. EP14813438.0 Search Report dated May 26, 2019.

* cited by examiner

*Primary Examiner* — Catherine Loikith
(74) *Attorney, Agent, or Firm* — Mossman, Kumar & Tyler PC

(57) ABSTRACT

A fuel cell for use in downhole applications stores steam created by the chemical reaction in a desiccant like Zeolite. The fuel cell also uses ambient hydrostatic pressure to increase cell voltage and power-density.

12 Claims, 2 Drawing Sheets

DOWNHOLE FUEL CELL WITH STEAM ADSORPTION AND PRESSURE COMPENSATION AND METHODS OF USING SAME

CROSS REFERENCE TO RELATED APPLICATIONS

This application is a continuation of U.S. application Ser. No. 13/920,623, filed Jun. 18, 2013, the entire disclosure of which is incorporated herein by reference in its entirety.

BACKGROUND OF THE DISCLOSURE

1. Field of the Disclosure

The present disclosure is related to fuel cells.

2. Background of the Art

Fuel cells make use of an electrochemical reaction involving a fuel and an oxidant in a cell that comprises an anode, cathode, and electrolyte, to generate electricity without also generating the unwanted by-products associated with combustion, while providing relatively higher energy efficiency. Thus, fuel cells potentially have a number of advantages over other power generation or storage means in many applications. A number of obstacles have hindered the use of fuel cells in high power and/or long term downhole applications. For instance, the reaction product, typically water, needs to be removed from the fuel cell stack in order to continuously run the fuel cell. Removal of the water downhole presents a challenge because the surrounding pressure is commonly higher than that present in a conventional fuel cell placed at surface in an ambient environment and operating in air.

The present disclosure addresses this and other challenges for use of fuel cells in wellbore environments.

SUMMARY OF THE DISCLOSURE

In some aspects, the present disclosure relates to a wellbore apparatus that may include a downhole tool conveyed into the wellbore with a conveyance device; a fuel cell associated with the downhole tool; and a desiccant receiving a fluid byproduct produced by the fuel cell.

In aspects, the present disclosure relates to a wellbore apparatus that may include a downhole tool configured to be conveyed into the wellbore with a conveyance device; a fuel cell associated with the downhole tool; and a pressure applicator increasing a hydrostatic pressure applied to the fuel cell.

Examples of certain features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Figure 1:
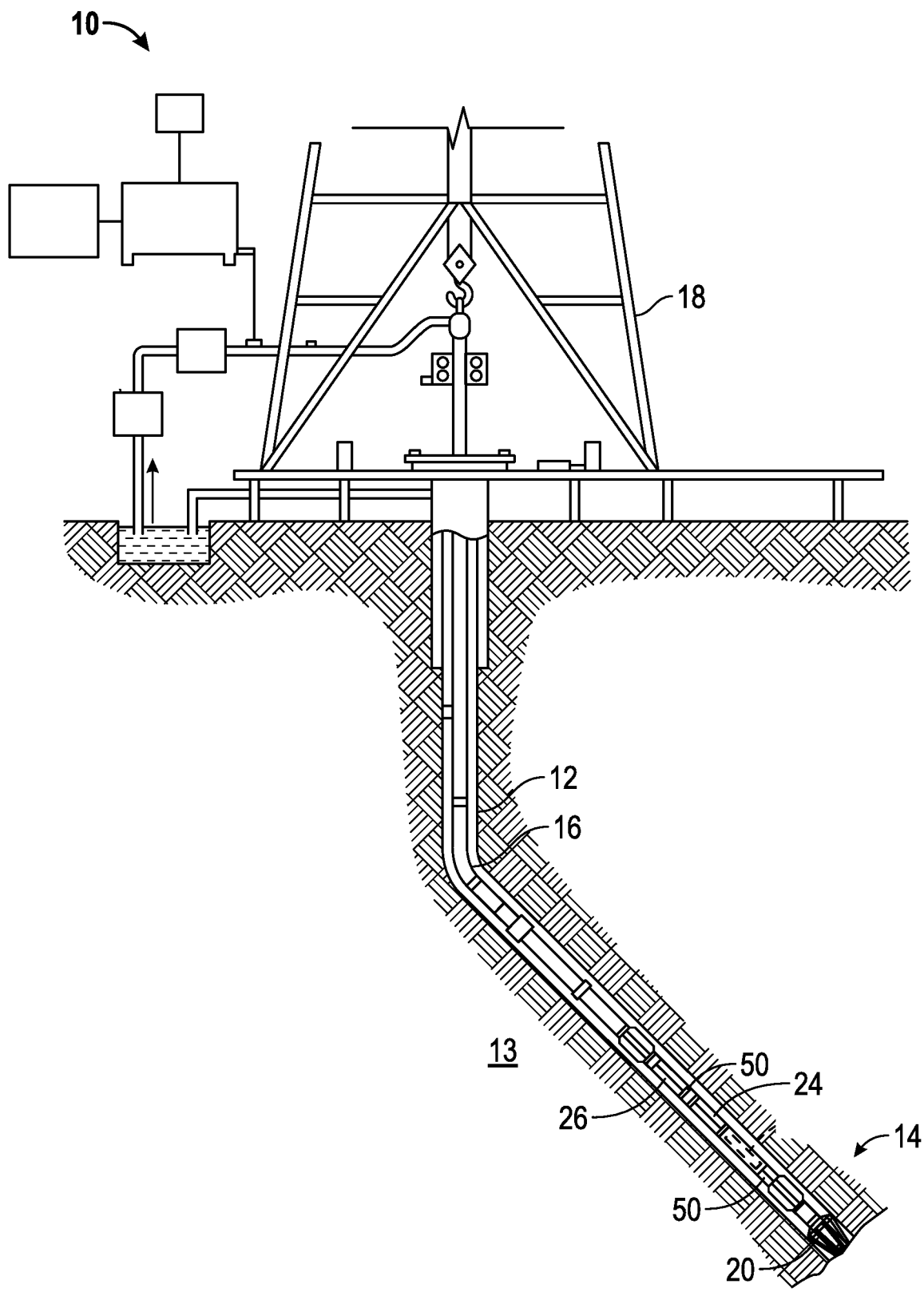
FIG. 1 is a schematic diagram of an exemplary drilling system for drilling a wellbore using a fuel cell arrangement according to the present disclosure.

Referring now to FIG. 1, there is schematically illustrated a drilling system 10 for forming a wellbore 12 in an earthen formation 13. While a land-based rig is shown, these concepts and the methods are equally applicable to offshore drilling systems. Also, the wellbore 12 may include vertical sections, deviated sections, and horizontal sections, as well as branch wellbores. The drilling system 10 may use a bottomhole assembly (BHA) 14 conveyed by a rigid wellbore conveyance device such as a drill string 16 suspended from a rig 18. The drill string 16 may include a drill bit 20 at a distal end. The drill string 16 may include any known drilling tubular adapted for use in a wellbore, e.g., jointed drill pipe, coiled tubing, casing, liner, etc.

The BHA 14 can also contain directional sensors and formation evaluation sensors or devices (also referred to as measurement-while-drilling, "MWD," or logging-while-drilling, "LWD," sensors) determining resistivity, density, porosity, permeability, acoustic properties, nuclear-magnetic resonance properties, corrosive properties of the fluids or formation downhole, salt or saline content, and other selected properties of the formation 13 surrounding the BHA 14. The BHA 14 can further include a variety of other sensors and communication devices 24 for controlling and/or determining one or more functions and properties of the BHA (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc. A suitable telemetry sub 26 using, for example, two-way telemetry, is also provided as illustrated in the BHA 14 and provides information from the various sensors and to the surface. The bottomhole assembly 14 can also include one or more fuel cells 50 configured to supply electrical energy to the various electronic or sensor components of the BHA 14.

Although the fuel cells 50 disclosed herein is discussed with respect to the exemplary drilling system 10 of FIG. 1, alternate embodiments wherein the fuel cell 50 is incorporated into a tool conveyed by a non-rigid conveyance device such as a wireline, slickline, e-line, or coiled tubing, is also considered within the scope of the present disclosure.

Figure 2:
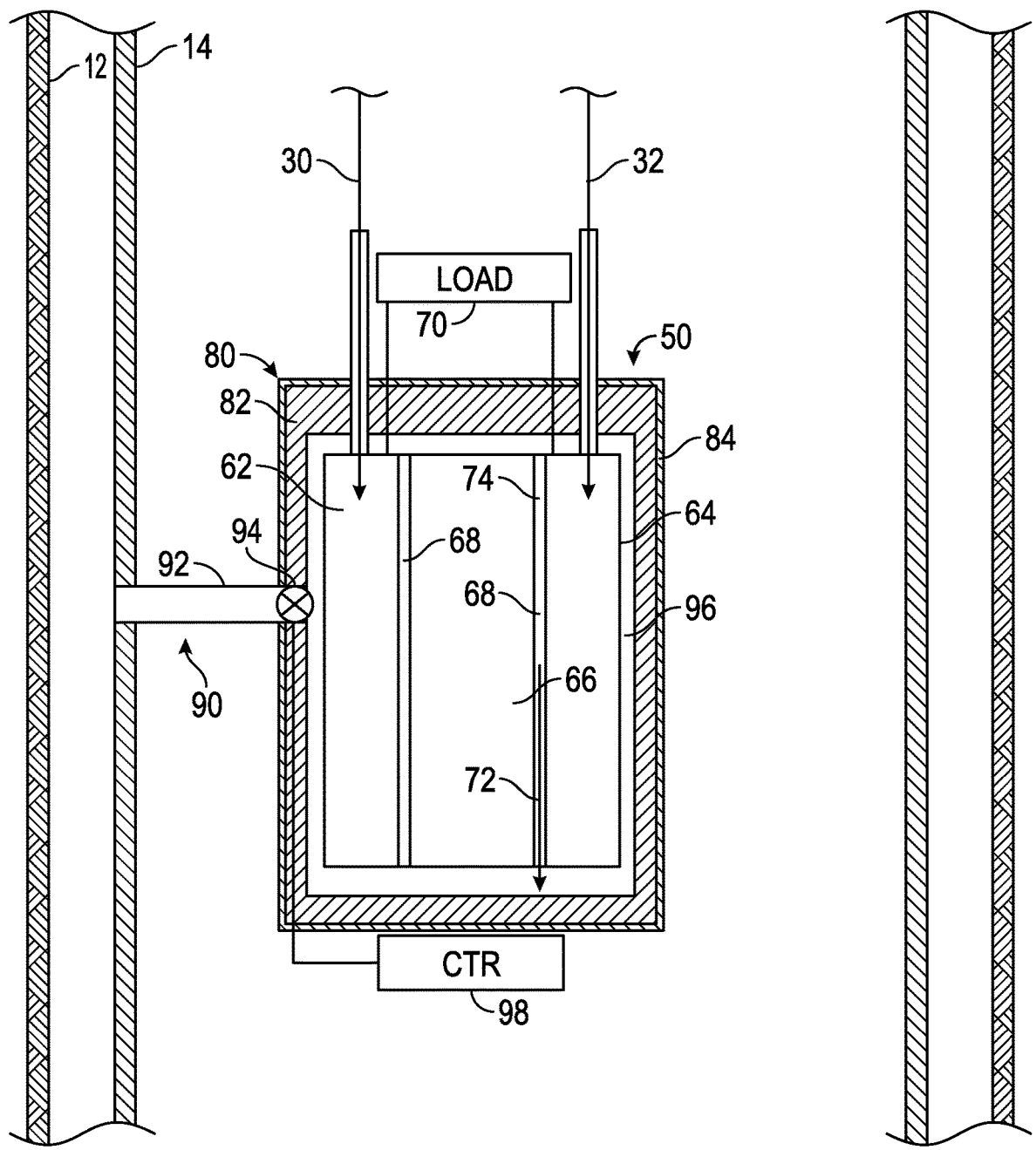
FIG. 2 shows one embodiment of a fuel cell with water sorption device and pressure compensation device according to the present disclosure.

Turning now to FIG. 2, there is schematically shown one embodiment of a fuel cell 50 according to the present disclosure that may be used with a BHA 14 in a wellbore 12. In a fuel cell 50, electrical energy is created by a catalytic oxidation of hydrogen. The chemical reaction can be seen as a reverse reaction to the electrolytic decomposition of water.

The fuel cell 50 may include two electrodes, an anode 62 and a cathode 64, that are separated by an electrolyte 66. The anode 62 receives a flow of hydrogen 30 and the cathode 64 receives a flow of an oxidant 32, such as oxygen. Gas diffusion layers 68 may be used to separate the electrolyte 66 from the electrodes 62, 64. At the anode 62, hydrogen atoms are separated into protons and electrons. While the protons diffuse through the electrolyte 66 to the cathode 64, the electrons have to travel via an outside electrical circuit 70 to the anode 62. At the anode 62, protons and electrons form hydrogen again and react with oxygen to produce a fluid byproduct, such as water 72, at the cathode 64. The byproduct may be gaseous water or liquid water.

For optimal operation of the fuel cell 50, the water 72 (e.g., water droplets) should be removed from the surface 74 of the cathode 64. Embodiments of the present disclosure include a water sorption device 80 for storing the water 72. The water sorption device 80 may use either adsorption or absorption for water removal. Adsorption is the adhesion of atoms, ions, or molecules from a gas, liquid, or dissolved solid to a surface. Absorption occurs when a fluid permeates a solid.

In one arrangement, the water sorption device 80 may be configured to use an adsorption process to store the water 72 in a solid media 82. One suitable desiccant for the solid media 82 is Zeolite. Zeolite can be formed to store up to 25% water under downhole conditions. In some embodiments, the pressure is controlled so that the vapor pressure of steam that is in contact with Zeolite is relatively low. However, the present disclosure is not limited to any particular type of desiccant. In such embodiments, the surface 74 of cathode 64 may be directed passively, i.e., without use of additional components.

As shown the solid media 82 may be disposed in an enclosure 84 that also encloses the fuel cell 50. Thus, the water 72, which is in the form of a gas (i.e., water vapor or steam), may flow to and into the solid media 82. In other embodiments, the solid media 82 may be disposed in a separate enclosure (not shown). Also, while natural diffusion may be used to transport the water 72 to the solid media 82. In other embodiments, devices that control temperature or some other parameter may be used to actively move the water 72. In either instance, the surface 74 of the cathode 64 is kept in a substantially dry condition. The term "substantially" generally means that the cathode 64 is dry enough such that the fuel cell 50 can continue to generate electrical energy.

In another aspect, the fuel cell 50 may use a controlled pressure to enhance fuel cell voltage and power. In one arrangement, the fuel cell 50 may include a pressure applicator 90 that can vary (e.g., increase or decrease) a pressure applied to the fuel cell 50 and to the in-flowing gases 30, 32. The pressure applicator 90 may include a passage 92 that is in fluid communication with a wellbore fluid (not shown) surrounding the BHA 14. In some arrangements, the pressure applicator 90 may be configured to apply all or a portion of the hydrostatic pressure of the surrounding wellbore fluid to the fuel cell 50. A compensator 94 may be positioned along the passage 92 that converts or transforms the hydrostatic pressure of the wellbore fluid in the passage 92 of a suitable conduit such as a probe or tube into a pressure that is applied to an interior 96 of the fuel cell 50 or to individual features, such as the electrodes 62, 64. The compensator 94 may use known devices for controlling fluid flow such as valves, valve actuators, throttles, and closed hydraulic fluid systems. The compensator 94 may also use known mechanisms such as variable volume pistons-cylinder arrangements or bladders that can communicate pressure while isolating the interior 96 from the wellbore fluid (not shown) in the passage 92. In some embodiments, a controller 98 may be used to adjust the amount of pressure applied to the fuel cell 50.

In other embodiments, the pressure may be applied using a downhole pressure source (e.g., a compressed gas or biasing element such as a spring). That is, the pressure applicator may use an onboard artificial pressure source as opposed to a naturally occurring pressure source.

While the foregoing disclosure is directed to the one mode embodiments of the disclosure, various modifications will be apparent to those skilled in the art. For example, while the fuel cell 50 is shown with both a water sorption device and a pressure applicator, a fuel cell 50 may use one of these two features. It is intended that all variations within the scope of the appended claims be embraced by the foregoing disclosure.

We claim:

1. An apparatus for use in a wellbore having a wellbore fluid at a hydrostatic pressure, comprising:
   a downhole tool configured to be conveyed into the wellbore with a conveyance device;
   a fuel cell associated with the downhole tool, the fuel cell receiving a flow of an oxidant and a flow of hydrogen; and
   a pressure applicator applying at least a portion of the hydrostatic pressure of the wellbore fluid to the fuel cell to increase a pressure applied to the fuel cell.

2. The apparatus of claim 1, wherein the pressure applicator communicates at least a portion of the hydrostatic pressure to the fuel cell via a passage in communication with the wellbore fluid surrounding the downhole tool.

3. The apparatus of claim 1, wherein the hydrostatic pressure is applied to at least one fluid fed to the fuel cell.

4. The apparatus of claim 3, the at least one fluid is one of: (i) hydrogen, and (ii) oxygen.

5. The apparatus of claim 1, wherein the pressure applicator is configured to increase the hydrostatic pressure to a predetermined maximum pressure.

6. The apparatus of claim 1, wherein the pressure applicator is configured to apply at least a portion of the hydrostatic pressure to an interior of the fuel cell.

7. The apparatus of claim 1, wherein the pressure applicator is configured to apply at least a portion of the hydrostatic pressure to at least one electrode disposed in an interior of the fuel cell.

8. A method for use in a wellbore having a wellbore fluid at a hydrostatic pressure, comprising:
   conveying a downhole tool into the wellbore with a conveyance device, the downhole tool having an associated fuel cell, the fuel cell receiving a flow of an oxidant and a flow of hydrogen; and
   applying at least a portion of the hydrostatic pressure of the wellbore fluid to the fuel cell to increase pressure applied to the fuel cell using a pressure applicator.

9. The method of claim 8, wherein the pressure applicator communicates at least a portion of the hydrostatic pressure to the fuel cell via a passage in communication with the wellbore fluid surrounding the downhole tool.

10. The method of claim 8, wherein the hydrostatic pressure is applied to at least one fluid fed to the fuel cell.

11. The method of claim 10, the at least one fluid is one of: (i) hydrogen, and (ii) oxygen.

12. The method of claim 8, wherein the pressure applicator is configured to increase the hydrostatic pressure to a predetermined maximum pressure.

* * * * *